US012606458B2

(12) United States Patent　　　(10) Patent No.:　US 12,606,458 B2

Olaru　　　　　　　　　　　　　　(45) Date of Patent:　　Apr. 21, 2026

(54) PORTABLE WATER SOFTENER WITH INTEGRATED PRE-FILTER FOR RVS

(71) Applicant: Constantin Olaru, Bucharest (RO)

(72) Inventor: Constantin Olaru, Bucharest (RO)

( * ) Notice: Subject to any disclaimer, the term of this patent is extended or adjusted under 35 U.S.C. 154(b) by 0 days.

(21) Appl. No.: 18/915,704

(22) Filed: Oct. 15, 2024

(65) Prior Publication Data

US 2026/0103398 A1　　Apr. 16, 2026

(51) Int. Cl.
　　C02F 1/00　　　　(2023.01)
　　C02F 1/42　　　　(2023.01)
(52) U.S. Cl.
　　CPC ................ C02F 1/003 (2013.01); C02F 1/42 (2013.01); *C02F 2307/00* (2013.01)
(58) Field of Classification Search
　　CPC .... C02F 1/002; C02F 1/003; C02F 2201/002; C02F 2201/008; C02F 9/20; C02F 1/42; C02F 2307/00; C02F 2303/22; C02F 5/00; C02F 2209/055; B01D 2201/265; A45F 2003/163; A23V 2250/1578; A23V 2250/161; B01J 49/75; A47L 2401/01
　　See application file for complete search history.

(56) References Cited

U.S. PATENT DOCUMENTS

| | | | |
|---|---|---|---|
| 4,151,092 A | 4/1979 | Grimm et al. | |
| 2005/0072720 A1* | 4/2005 | Sutera ...................... | B01J 49/75 |
| | | | 210/190 |
| 2009/0250397 A1 | 10/2009 | Geisen et al. | |

(Continued)

FOREIGN PATENT DOCUMENTS

KR　　　200363663 Y1 * 10/2004

OTHER PUBLICATIONS

Adventures with B+C channel "New NP Global Portable Water Softener with a Pre-Filter", uploaded on YouTube on Sep. 3, 2024, retrieved from <https://www.youtube.com/watch?v=izKSEj6Cj_A> on Mar. 18, 2025 (Year: 2024).*

(Continued)

*Primary Examiner* — Benjamin L Lebron
*Assistant Examiner* — Bernadette Karen Mcgann
(74) *Attorney, Agent, or Firm* — Bay State IP, LLC

(57)　　　　　　ABSTRACT

A portable water softener with an integrated pre-filter, designed specifically for use in recreational vehicles (RVs). The device combines water filtration and softening in a single, compact unit, providing an efficient solution for improving water quality in mobile environments. The pre-filter removes impurities such as sand, rust, sediments, bad taste, odour, and volatile organic compounds (VOCs) before the water enters the softening chamber (104). The softening chamber (104) contains resin beads that perform ion exchange, removing hardness-causing calcium and magnesium ions. The integrated design enhances the efficiency of the water softening process, reduces the need for multiple devices, and simplifies installation and maintenance. The device is protected by a durable neoprene sleeve, making it suitable for various environmental conditions encountered during travel. The invention offers an effective, user-friendly, and portable solution for ensuring high-quality water in RVs, addressing the limitations of existing water softening and filtration systems.

8 Claims, 8 Drawing Sheets

(56) References Cited

U.S. PATENT DOCUMENTS

2011/0147315 A1*  6/2011  Hellenbrand ...... B01D 24/4853
                                                    210/670
2022/0289609 A1*  9/2022  Raymont ................. C02F 9/00

OTHER PUBLICATIONS https://adventureswithbc.com/blog/f/all-new-np-global-portable-water-softener-with-pre-filter?blogcategory=RV+Products, published on the internet on Sep. 2, 2024, retrieved from internet on Mar. 18, 2025 (Year: 2024).*

Amazon Product Page of RV Water Softener Portable, https://www.amazon.com/NPGLOBAL-Water-Softener-Portable-Convenient/dp/B09XG334TN?ref_=ast_sto_dp&th=1, published on Jan. 30, 2022, and retrieved on Mar. 19, 2025 (Year: 2022).*

Machine generated translation of KR 200363663 Y1 (Year: 2004).* https://waterestore.com/products/neoprene-softener-jacket-10-x-54-tj 1054zip?srsltid=AfmBOopUFMNPu5mZ9EWqS6dX-ZLtPYz_5eipSj3QjlobtQyzuXN9qRTx (Year: 2023).* https://www.purolite.com/index/core-technologies/application/softening (Year: 2020).*

* cited by examiner

PORTABLE WATER SOFTENER WITH INTEGRATED PRE-FILTER FOR RVS

FIELD OF THE INVENTION

The present invention relates to the field of water treatment systems, specifically to portable water treatment devices designed for use in recreational vehicles (RVs). More particularly, it pertains to an integrated system that combines water softening and filtration functionalities into a single, portable unit to address the water quality challenges faced by RV users.

BACKGROUND OF THE INVENTION

1. Problem in the State of the Art

Water quality is a significant concern for RV users who rely on varying water sources during their travels. These water sources often contain hard water minerals such as calcium and magnesium, as well as impurities like sand, rust, sediments, and various organic and inorganic contaminants. Hard water can cause scale buildup in plumbing systems, reduce the effectiveness of soaps and detergents, and lead to unpleasant tastes and odours in water. On the other hand, impurities can clog water systems, damage appliances, and negatively impact the overall quality of water used for bathing, washing your hands, and cleaning.

Existing portable water softeners for RVs are designed to address the problem of hard water by removing calcium and magnesium ions through ion exchange processes. However, these devices typically lack an integrated filtration system, meaning they do not effectively remove other impurities before the softening process. As a result, impurities can enter the softening chamber, potentially reducing the efficiency of the ion exchange process, causing clogging, and leading to the degradation of the softening media.

Moreover, the absence of a pre-filtration stage in these systems often necessitates the use of additional, separate filtration devices, increasing the complexity, cost, and maintenance requirements for RV users. The need for multiple devices also increases the number of connections and potential points of failure, further complicating the water treatment process.

2. Prior Art

Several patents and prior art documents have addressed aspects of water softening and filtration, but they fall short of providing a fully integrated solution specifically designed for the unique requirements of RV users.

US20090250397A1 discloses systems and methods for filtering and softening water in combination. This prior art includes a water filtering system connected to a water softening system, with the added feature of a controller that monitors and adjusts the performance of both systems based on water hardness levels. However, this solution is complex and may not be easily portable or specifically tailored for RV use. The presence of a controller and the necessity of monitoring water hardness levels adds complexity and cost, which may not be ideal for all users.

U.S. Pat. No. 4,151,092A discloses a portable water filter system that allows for the manual pumping of water through a filtering cartridge. While this system effectively removes undesired colour, taste, and odour from water, it does not address water hardness and does not integrate a softening component. The manual operation and focus on filtering only make this system less suitable for users who require both filtration and softening in a compact, easy-to-use unit.

SUMMARY OF THE INVENTION

The present invention overcomes the limitations of the prior art by providing a portable water softener with an integrated pre-filter specifically designed for RV use. This system combines the essential functions of water softening and filtration into a single, portable unit, simplifying the water treatment process for RV users. The integrated pre-filter removes impurities such as sand, rust, sediments, bad taste, odour, colour, volatile organic compounds (VOCs), trihalomethanes (THMs), turbidity, and corrosion before the water enters the softening chamber. This not only improves the efficiency of the softening process but also ensures that the water delivered to the RV is of high quality and suitable for all uses.

This figure shows a cross-sectional view of the portable water treatment device, highlighting the internal components, including the pre-filter and softening chamber. The flow of water through the unit is depicted, illustrating how water passes through the pre-filter first and then enters the softening chamber before exiting the unit.

Figure 1:
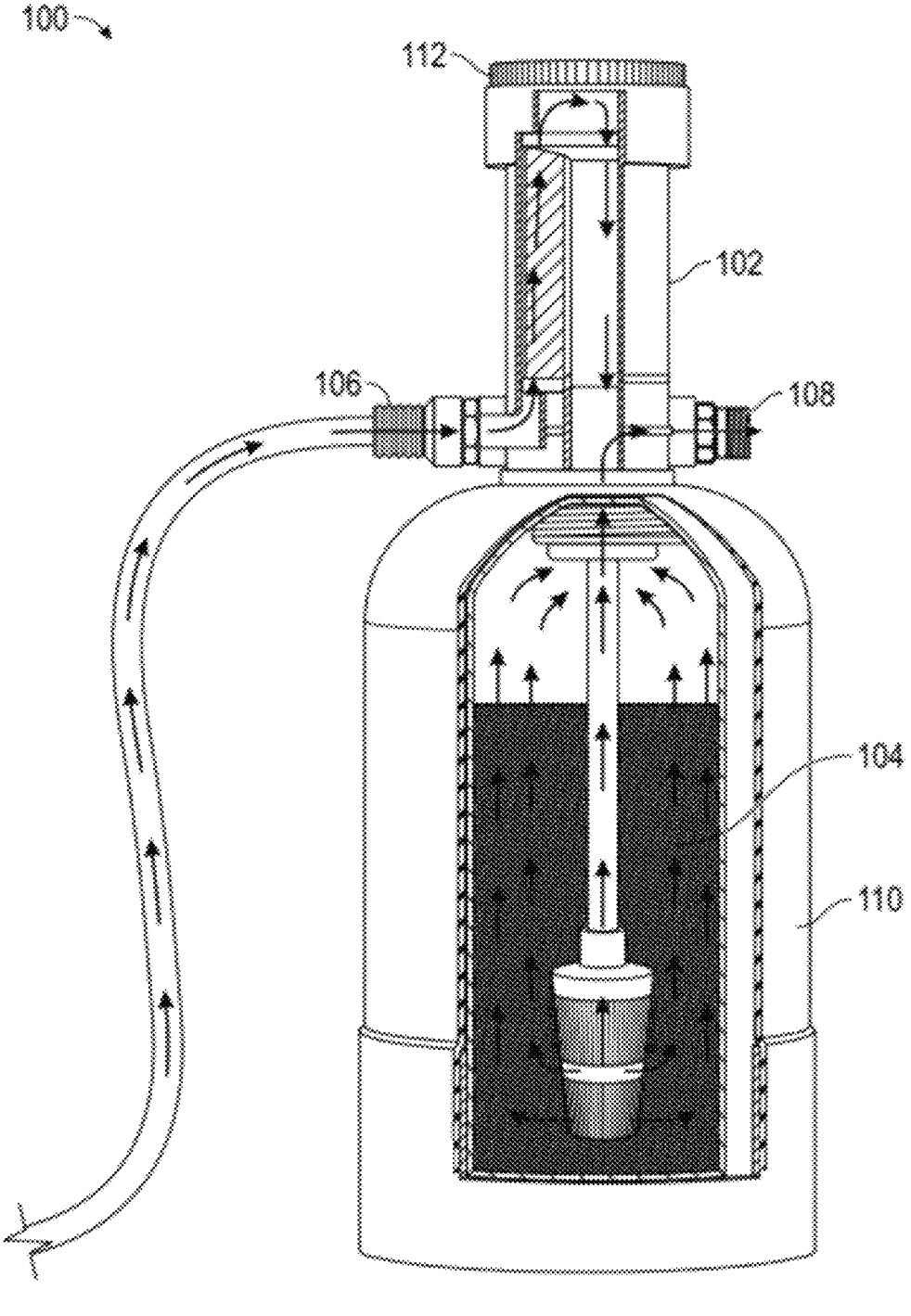
FIG. 1: Cross-Sectional View of the Water Softener
Figure 2:
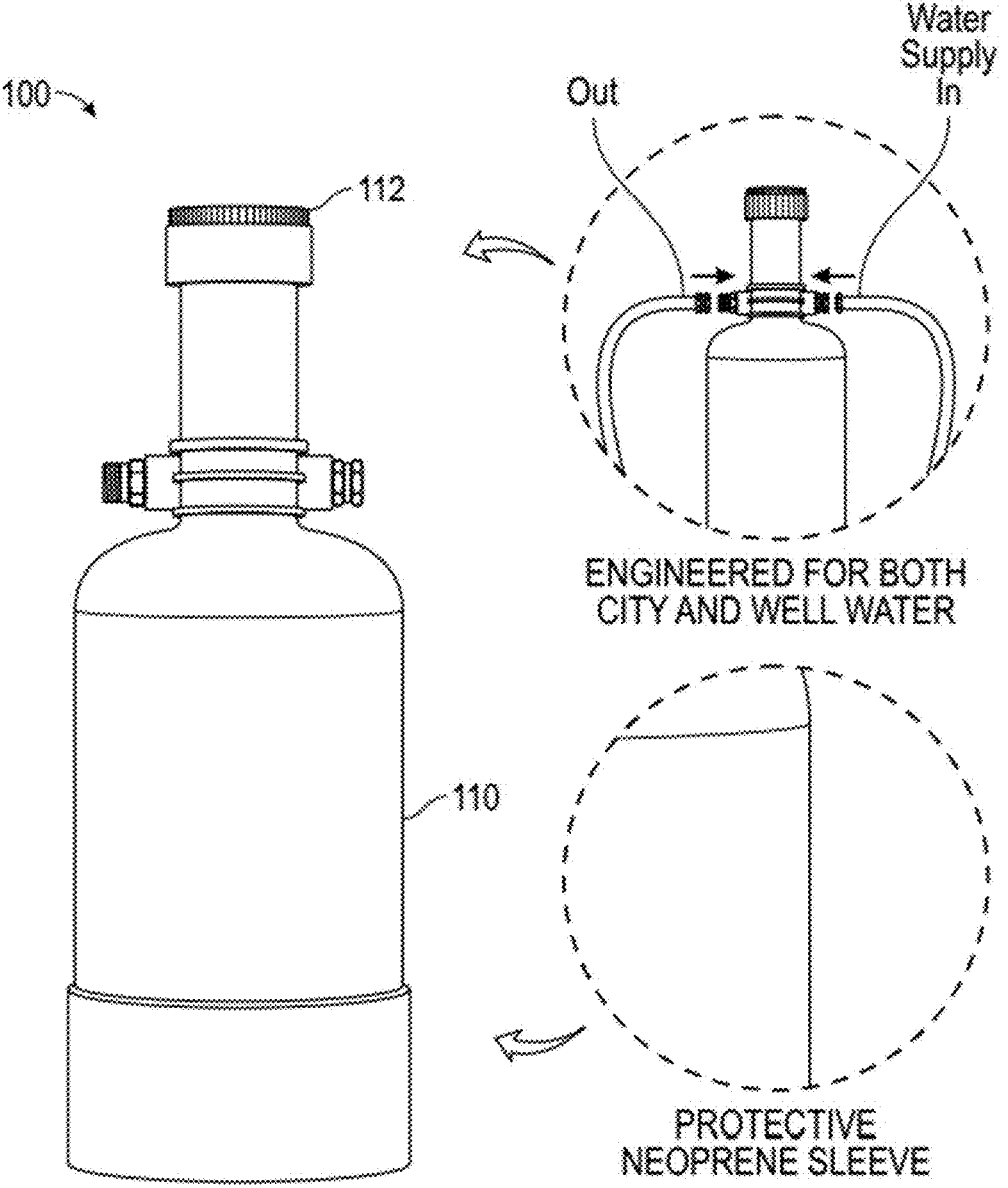

FIG. 2: External View of the Portable Water Softener

This figure provides an external view of the portable water softener, with key features labelled. It shows the overall design of the unit, including the protective neoprene sleeve, pre-filter chamber, softening chamber, and the inlet and outlet connections.

Figure 3:
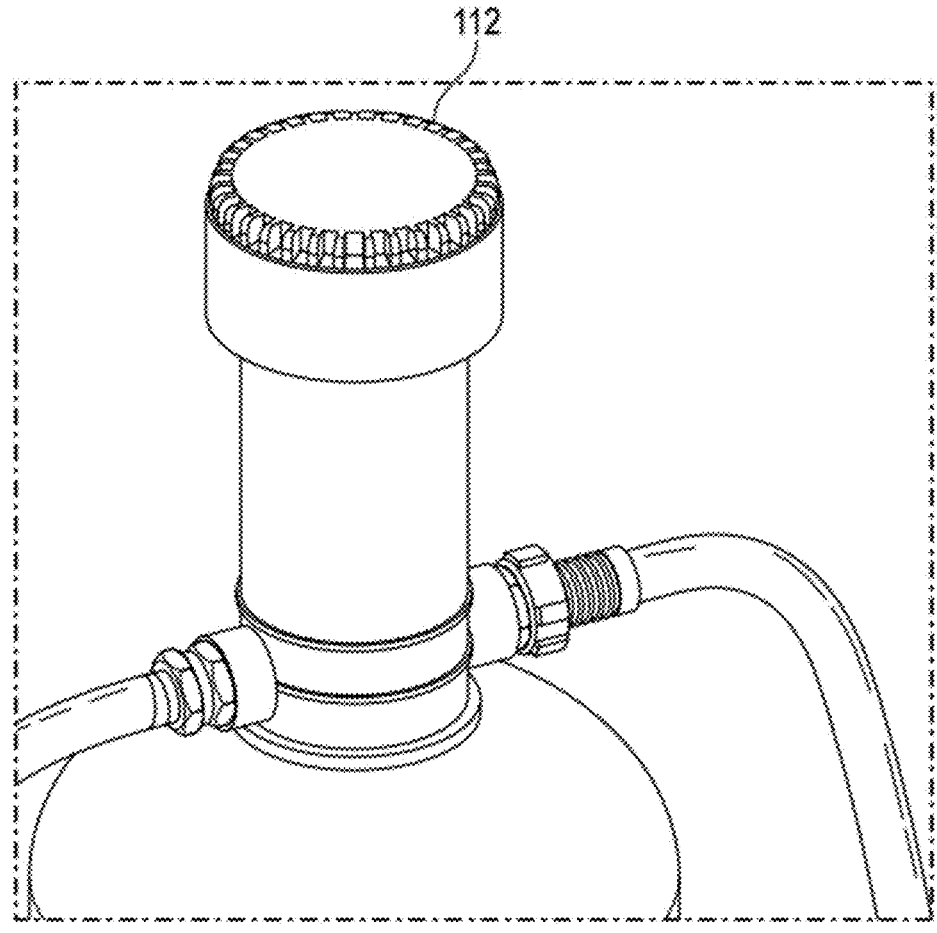
Figure 4:
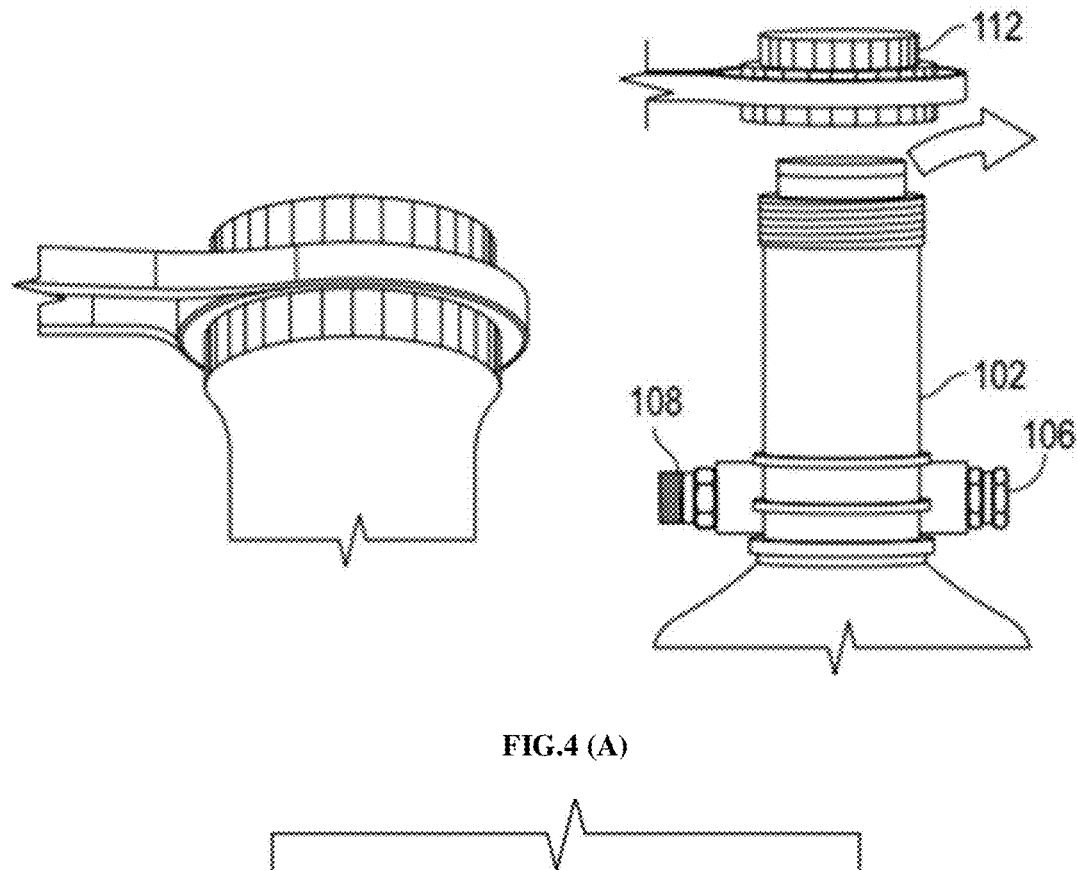
Figure 4:
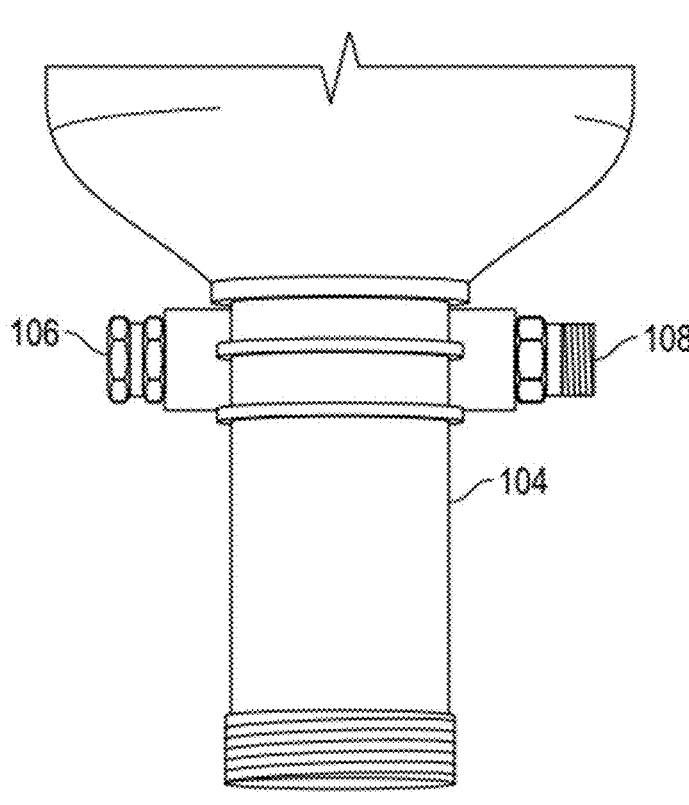
Figure 4:
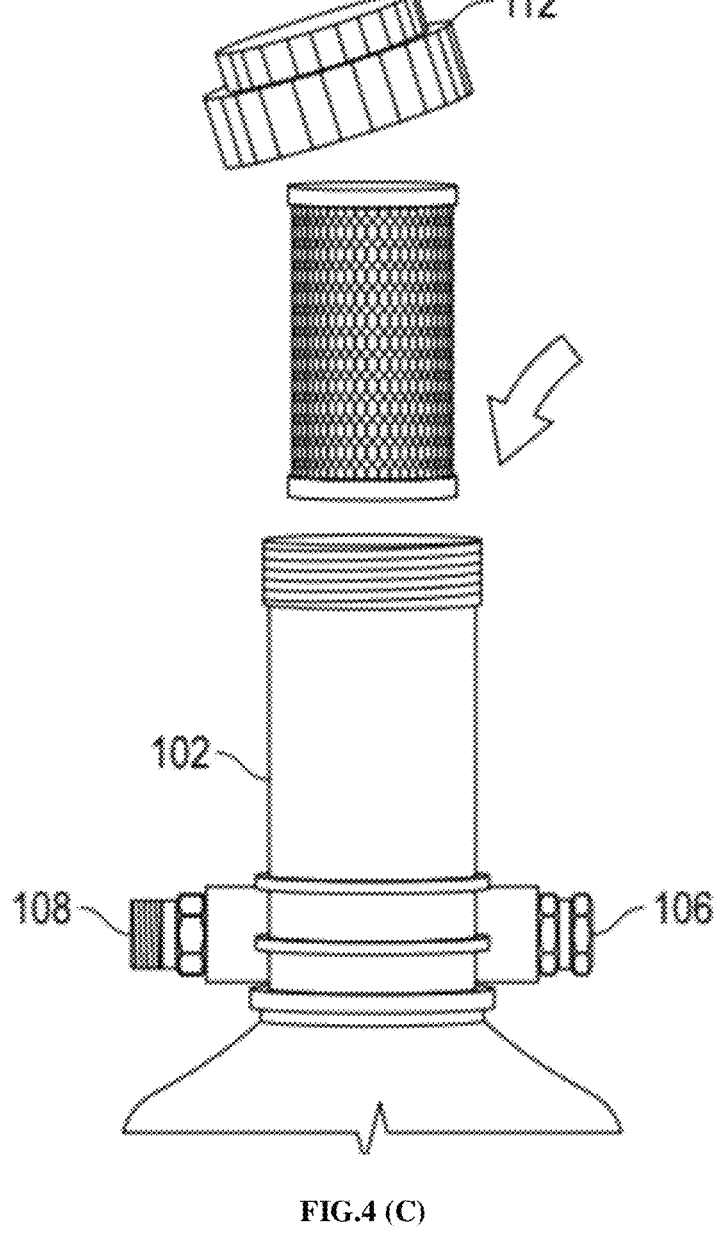
Figure 4:
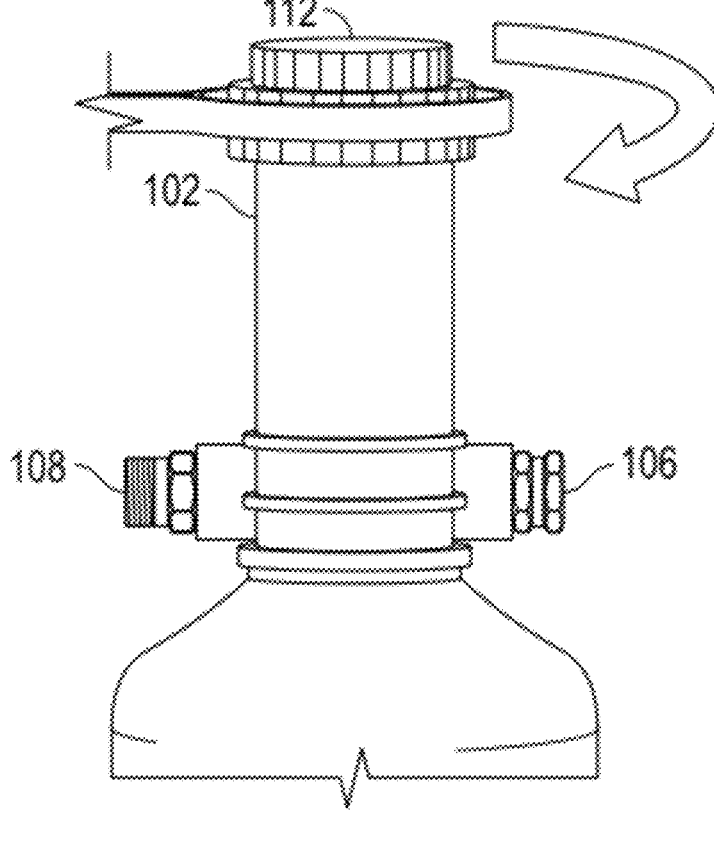

FIG. 3: Close-Up View of the Inlet and Outlet Connections

This figure offers a detailed close-up of the inlet and outlet connections. It illustrates the design of these connections, focusing on their ease of use and compatibility with standard RV water systems, ensuring a secure and straightforward installation.

FIGS. 4(A)-4(D): Filter Replacement Process

These figures depict the process of replacing the pre-filter within the unit. It shows the removal of the cap using the custom wrench provided, the extraction of the old filter, and the installation of a new filter. The figure highlights the user-friendly design that facilitates quick and easy maintenance.

Figure 5:
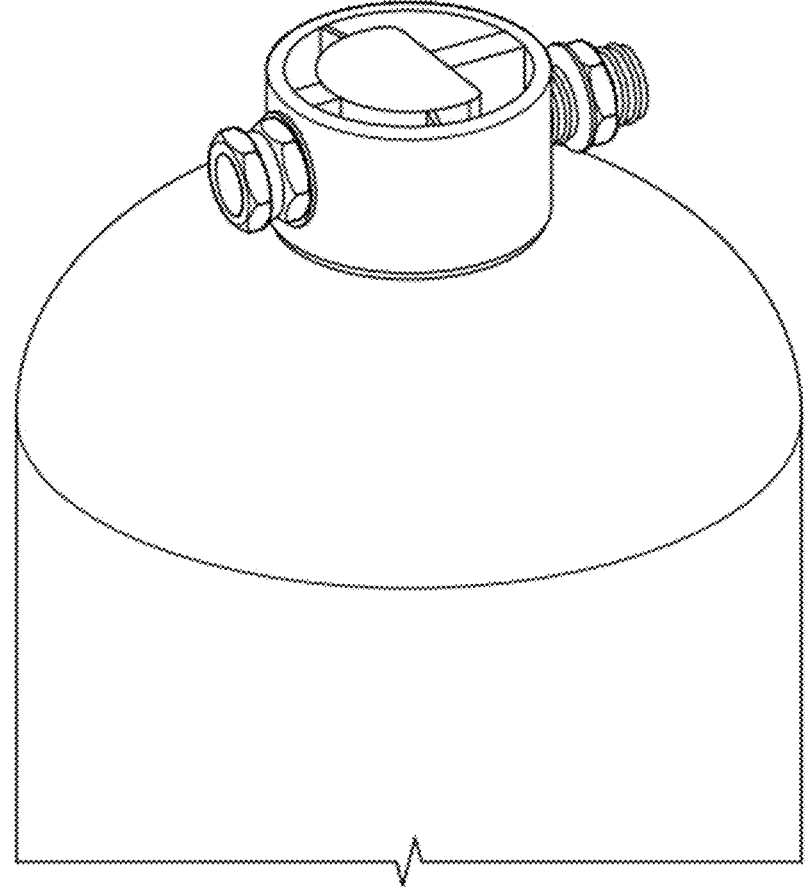
Figure 6:
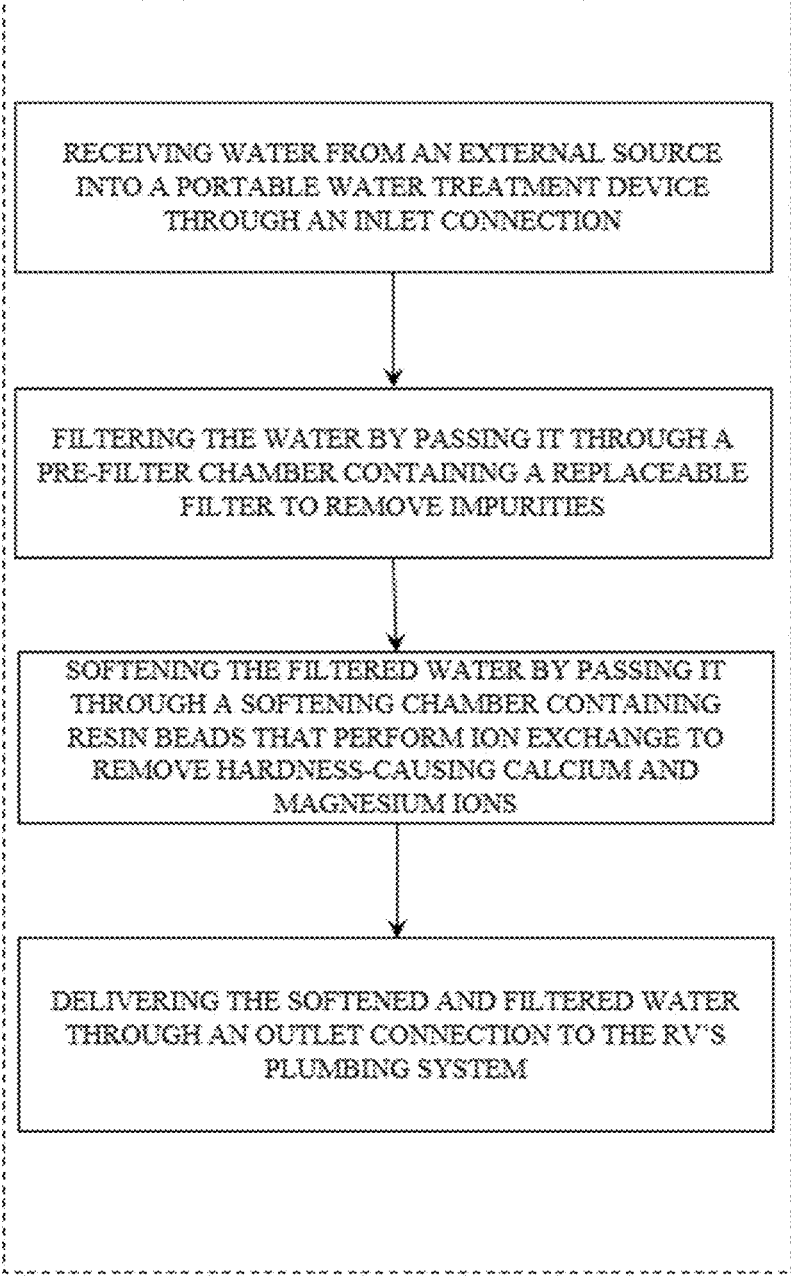

FIG. 5: Water Treatment Process in a Recreational Vehicle Without Pre-Filter Operation This figure illustrates view of the portable water treatment device configured to optionally operate without the pre-filter chamber, allowing water to flow directly into the softening chamber for ion exchange, thereby providing water softening functionality irrespective of the presence of the pre-filter component FIG. 6: Block Diagram of the Water Treatment Method in Recreational Vehicle This figure provides the block diagram explaining method of treating water in a recreational vehicle.

DETAILED DESCRIPTION OF THE INVENTION

1. Overview of the System

The invention comprises a compact, portable water treatment device (100) that integrates both a pre-filter and a water softener into a single unit. The system is designed to be easily connected to an RV's water supply, allowing users to treat incoming water efficiently and effectively. The device includes the following key components:

Pre-filter chamber (102): This chamber houses a replaceable filter designed to remove a wide range of impurities from the water before it enters the softening chamber (104). The pre-filter ensures that only clean water reaches the softening media, thus enhancing the performance and longevity of the softening process.

Softening chamber (104): The softening chamber (104) contains resin beads that perform ion exchange to remove hardness-causing calcium and magnesium ions from the water. The softening chamber (104) is directly connected to the pre-filter chamber (102), allowing water to flow sequentially through both stages.

Protective Neoprene Sleeve: The entire unit body is encased in a protective neoprene sleeve that provides durability, insulation, and protection against environmental factors encountered during travel and use.

Inlet and Outlet Connections: The unit is equipped with standard inlet and outlet connections (108) made from corrosion-resistant materials, ensuring compatibility with common RV water systems and providing a secure, leak-proof connection.

2. Description of Components 2.1. Pre-Filter Chamber (102)

The pre-filter chamber (102) is the first stage in the water treatment process. Water from the RV's external source enters the pre-filter chamber (102) through the inlet connection (106). The pre-filter is designed to remove various impurities, including but not limited to:

Sediments (e.g., sand, rust, and dirt): These particles can cause clogging and reduce the effectiveness of the water softener if not removed prior to the softening stage.

Bad taste and odour: Often caused by organic contaminants or chemicals, these are effectively reduced by the pre-filter.

Colour: Discoloration in water can be caused by dissolved organic matter or iron; the pre-filter helps to remove these substances.

Volatile Organic Compounds (VOCs) and Trihalomethanes (THMs): These harmful chemicals, often found in treated municipal water, are reduced by the pre-filter, improving the safety and quality of the water.

Turbidity: Cloudiness in water, caused by suspended solids, is also reduced by the pre-filter.

Corrosion: Metal particles resulting from corrosion in pipes can be removed, protecting both the water softener and the RV's plumbing system.

The pre-filter is housed in a dedicated chamber located above the softening chamber (104). This design ensures that water flows through the pre-filter before reaching the resin beads, preventing any large particles or contaminants from entering the softening stage. The filter itself is replaceable, ensuring that the system can be easily maintained over time. The filter is accessed via a cap that can be unscrewed using a custom wrench provided with the unit, allowing for quick and easy replacement without the need for specialized tools or professional assistance.

2.2. Softening Chamber (104)

The softening chamber (104) is the core of the water softening process. After being filtered, the water enters the softening chamber (104), where it encounters a bed of resin beads. These beads are composed of a food grade ion exchange cation resin designed to remove calcium and magnesium ions from the water, which are the primary causes of water hardness.

The ion exchange process involves the resin beads exchanging sodium or potassium ions with the calcium and magnesium ions in the water. This exchange effectively removes the hardness-causing ions, resulting in softened water. The softening chamber (104) is designed to operate under the pressure provided by the RV's water system, ensuring that water flows smoothly through the resin bed and that the ion exchange process is efficient.

The design of the softening chamber (104) ensures that water flows evenly through the resin bed, maximizing the contact time between the water and the resin beads. This results in a more efficient ion exchange process and ensures that the softened water is of consistent quality.

2.3. Protective Neoprene Sleeve

The protective neoprene sleeve encases the entire water treatment unit body, providing several important functions:

Durability: The sleeve protects the unit from physical damage that may occur during transport or use, such as impacts, scratches, or exposure to harsh environmental conditions.

Insulation: The neoprene material provides thermal insulation, helping to maintain a stable temperature within the unit and protecting the resin beads from temperature fluctuations that could affect their performance.

Weather Resistance: The sleeve offers protection against moisture, dust, and UV radiation, ensuring that the unit remains functional and reliable even in challenging outdoor environments.

The sleeve is designed to fit snugly around the unit, with opening for the cap with the inlet and outlet connections (108). It is easily removable, allowing users to access the internal components for maintenance or inspection.

2.4. Inlet and Outlet connections (108)

The inlet and outlet connections (108) are critical components that enable the water treatment unit to be integrated with the RV's water system. These connections are designed with the following features:

Corrosion Resistance: Made from durable materials such as brass or stainless steel, the connections are resistant to corrosion, ensuring a long service life and reducing the risk of leaks.

Standard Fittings: The connections are equipped with standard fittings, making them compatible with a wide range of RV water systems. This ensures that the unit can be easily installed without the need for adapters or specialized tools.

Secure Seals: The design of the connections includes secure seals that prevent leaks and ensure a tight, reliable connection to the RV's water supply.

The inlet connection (106) allows water to enter the pre-filter chamber (102), while the outlet connection (108) directs the softened and filtered water into the RV's plumbing system. The placement of the connections ensures that the water flows smoothly through the entire unit, from filtration to softening, before being delivered to the RV.

3. Operational Sequence

The operation of the portable water softener with integrated pre-filter is straightforward and user-friendly, designed to provide high-quality water with minimal user intervention. The operational sequence is as follows:

1. Water Entry: Water from the RV's external water source, such as a campground water hookup or an onboard water tank, enters the unit through the inlet connection (106).

2. Pre-Filtration: The water first passes through the pre-filter chamber (102), where the replaceable filter removes impurities such as sand, rust, sediments, bad taste, odour, colour, VOCs, THMs, turbidity, and corrosion. This pre-filtration step ensures that the water entering the softening chamber (104) is clean and free from particles that could clog the resin bed or reduce the efficiency of the ion exchange process.

3. Water Softening: After pre-filtration, the water flows into the softening chamber (104). The resin beads within the chamber perform the ion exchange process, removing calcium and magnesium ions and thereby softening the water. The design of the chamber ensures that the water flows evenly through the resin bed, maximizing contact time and ensuring consistent water softening.

4. Water Exit: The softened and filtered water exits the unit through the outlet connection (108), delivering high-quality water to the RV's plumbing system. This water is now suitable for all major uses, including washing your hands, cleaning, and bathing.

5. Maintenance: The system is designed for easy maintenance. The pre-filter can be replaced by unscrewing the cap with the custom wrench provided, allowing for quick and hassle-free filter changes. The protective neoprene sleeve can be removed to inspect the unit or perform any necessary repairs.

4. Advantages of the Invention

The portable water softener with integrated pre-filter offers several significant advantages over existing systems:

Integrated Design: By combining the functions of water softening and filtration into a single unit, the system simplifies the water treatment process for RV users. This reduces the need for multiple devices, minimizing the number of connections and potential points of failure.

Enhanced Water Quality: The pre-filter ensures that only clean water enters the softening chamber (104), improving the efficiency of the ion exchange process and extending the life of the resin beads. The result is consistently high-quality water that is free from hardness, impurities, and unpleasant tastes and odours.

Ease of Maintenance: The replaceable filter design allows for easy maintenance, ensuring that the system remains effective over time. The custom wrench and removable cap (112) make filter changes quick and user-friendly, reducing the need for professional service.

Portability: The compact and durable design of the unit makes it easy to transport and use in various RV setups. The protective neoprene sleeve ensures that the unit can withstand the rigors of travel, while the standard inlet and outlet connection (108) makes installation straightforward.

Protection: The neoprene sleeve protects the unit from environmental damage, ensuring that it remains functional and reliable even in challenging outdoor conditions. This extends the life of the unit and ensures consistent performance.

The portable water treatment device is designed with flexibility in mind, allowing users to tailor the water treatment process to their specific needs. In addition to the standard configuration where water flows sequentially through the pre-filter and then the softening chamber, the device is also capable of operating without the pre-filter chamber. This alternative configuration enables water to flow directly into the softening chamber, bypassing the pre-filter stage entirely. This optional bypass configuration is particularly useful in situations where pre-filtration is not necessary, such as when the incoming water is already free of large impurities, or when only water softening is required.

To facilitate this functionality, the device includes a removable connection that allows the pre-filter chamber to be replaced with a normal cap. When the pre-filter chamber is removed and replaced with the normal cap, the water inlet directs the incoming water straight into the softening chamber. The ion exchange process within the softening chamber proceeds as normal, with the resin beads removing calcium and magnesium ions to soften the water. This design ensures that the device maintains its core softening capability regardless of whether the pre-filter is in place.

The device provides users with the option to easily switch between modes of operation. A simple adjustment mechanism, such as interchangeable cap, allows for quick reconfiguration between filtered and unfiltered operation. By replacing the pre-filter chamber with the normal cap, water flows directly into the softening chamber. This feature provides enhanced versatility, making the device suitable for various water quality conditions and user preferences, without compromising on the core functionality of water softening.

Operating without the pre-filter offers several advantages, including reduced maintenance and operational simplicity when pre-filtration is unnecessary. By allowing the device to function without the pre-filter, users can avoid the need to replace or maintain the pre-filter component, thereby lowering operational costs and simplifying the overall use of the device. Additionally, this mode enhances water flow rates through the system, as the absence of pre-filter resistance allows water to pass through more quickly, which can be particularly beneficial in high-demand scenarios where rapid softening is required.

5. Technical Examples of Industrial Application

The portable water softener with integrated pre-filter is designed for industrial application in recreational vehicles, providing a robust solution for water treatment needs. The following examples illustrate the practical use of the invention:

Example 1: Campground Water Supply

An RV user connects the portable water softener to a campground water hookup. The water, which contains high levels of calcium and magnesium, as well as sediments from old pipes, first passes through the pre-filter, where the impurities are removed. The pre-filtered water then flows into the softening chamber (104), where the resin beads remove the hardness-causing ions. The softened and purified water is then delivered to the RV's plumbing system, providing clean, high-quality water for bathing, washing your hands, and cleaning.

Example 2: Onboard Water Tank

An RV user fills their onboard water tank from a local water source. Before the water is used in the RV, it is passed through the portable water softener with integrated pre-filter. The pre-filter removes any sediments, rust, and contaminants from the water, while the softening chamber (104) removes hardness ions. The result is high-quality water that is free from impurities and hardness, suitable for all uses within the RV.

Example 3: Harsh Environmental Conditions

An RV user travels through a region with extreme weather conditions, including high temperatures and dusty environments. The protective neoprene sleeve encasing the portable water softener ensures that the unit remains functional despite these harsh conditions. The sleeve provides thermal insulation, protecting the resin beads from temperature fluctuations, and prevents dust and moisture from entering the unit. The user can continue to enjoy clean, softened water throughout their travels, regardless of the environmental challenges.

The portable water softener with integrated pre-filter represents a significant advancement in water treatment technology for recreational vehicles. By combining filtration and softening into a single, portable unit, the invention provides a comprehensive solution that addresses the specific water quality challenges faced by RV users. The system is designed for ease of use, portability, and reliability, offering high-quality water with minimal maintenance requirements. With its integrated design, enhanced water quality, and user-friendly features, the invention sets a new standard for portable water treatment systems in the RV industry.

What is claimed is:

1. A portable water treatment device (100) for use in recreational vehicles (RVs), consisting of:
   a single housing defining an interior compartment;
   a pre-filter chamber (102) disposed within the housing;
   a softening chamber (104) positioned directly below the pre-filter chamber and directly connected to the pre-filter chamber (102), and
   a protective sleeve (110),
   wherein water flows sequentially from the prefilter chamber (102) into the softening chamber (104),
   an inlet connection (106) for receiving water from an external source into the pre-filter chamber (102);
   an outlet connection (108) for delivering softened and filtered water from the softening chamber (104) to an RV's plumbing system;
   and wherein the housing encases the pre-filter chamber and the softening chamber wherein the pre-filter chamber is positioned concentrically within the softening chamber in a nested, coaxial configuration, sharing a common, longitudinal axis within the housing, allowing water to only flow vertically and sequentially from the pre-filter chamber directly into the softening chamber.

2. The portable water treatment device (100) of claim 1, wherein the replaceable filter in the pre-filter chamber (102) is accessible via a removable cap (112), which can be unscrewed using a wrench provided with the device.

3. The portable water treatment device (100) of claim 2, wherein the removable cap (112) is designed to facilitate replacement of the filter.

4. The portable water treatment device (100) of claim 1, wherein the resin beads within the softening chamber (104) perform ion exchange under the pressure of the RV's water system, removing calcium and magnesium ions.

5. The portable water treatment device (100) of claim 1, wherein the inlet connection (106) and outlet connection (108) are made from corrosion-resistant materials.

6. The portable water treatment device (100) of claim 1, wherein the device is portable and designed for transportation and installation in various RV setups.

7. The portable water treatment device of claim 1, wherein the device is configured to optionally operate without the pre-filter chamber, allowing water to flow directly into the softening chamber for ion exchange, thereby providing water softening functionality irrespective of the presence of the pre-filter component.

8. The portable water treatment device of claim 1, wherein the protective sleeve (110) is made of neoprene.

* * * * *